United States Patent [19]
Smith

[11] Patent Number: 5,974,085
[45] Date of Patent: Oct. 26, 1999

[54] WIRELESS MODEM AND METHOD THEREFOR FOR ROUTING DATA TO AN APPLICATION OR TO STORAGE

[75] Inventor: Dwight Randall Smith, Grapevine, Tex.

[73] Assignee: Motorola, Inc., Schaumburg, Ill.

[21] Appl. No.: 09/061,645

[22] Filed: Apr. 17, 1998

[51] Int. Cl.[6] .................................. H04B 1/38; H04L 5/16
[52] U.S. Cl. ............................................ 375/222; 375/219
[58] Field of Search ............................. 375/222, 219, 375/220; 370/237, 392, 399, 363; 709/242

[56] References Cited

U.S. PATENT DOCUMENTS

| | | |
|---|---|---|
| 4,761,646 | 8/1988 | Choquet et al. ............... 340/825.52 |
| 5,153,867 | 10/1992 | Sin .................................. 370/85.1 |
| 5,202,899 | 4/1993 | Walsh ................................. 375/8 |
| 5,610,941 | 3/1997 | Tanaka et al. ..................... 375/222 |

*Primary Examiner*—Stephen Chin
*Assistant Examiner*—Mohammad Ghayour
*Attorney, Agent, or Firm*—R. Louis Breeden

[57] ABSTRACT

An application registry (226) is programmed (504) into a wireless modem (124) and includes routing information for routing data, based upon data type, to an application (244) or to storage (238, 236). Thereafter, the wireless modem receives (602) the data and determines (604) the data type. The wireless modem then routes (614, 628, 624, 618) the data in accordance with the routing information for the data type and, when the routing information indicates the application is located in an external device, further in accordance with the accessibility status of the external device.

18 Claims, 4 Drawing Sheets

| | DATA TYPE | APPLICATION | APPL LOCATION | NOTIFY | ROUTING |
|---|---|---|---|---|---|
| 302 | http | ThinBrowser | EXTERNAL DEV | APPL | FORWARD |
| | irc | mIRC | EXTERNAL DEV | APPL | FORWARD |
| | irc | PageChat | INTERNAL | APPL | FORWARD |
| | vcal | Calendar | INTERNAL | APPL | FORWARD |
| | bin/xls | Excel | EXTERNAL DEV | APPL | FORWARD |
| 302 | bin/xls | Excel | EXTERNAL DEV | USER | /PC_hold |
| | text/* | Msg | INTERNAL | USER | /msg |

304

226

WIRELESS MODEM AND METHOD THEREFOR FOR ROUTING DATA TO AN APPLICATION OR TO STORAGE

FIELD OF THE INVENTION

This invention relates in general to wireless communication systems, and more specifically to a wireless modem and method therefor for routing data to an application or to storage.

BACKGROUND OF THE INVENTION

Prior-art selective call receivers have comprised user applications which have provided messaging services directly to the user. These applications have received data delivered using explicit messaging vectors, such as numeric, alphanumeric, and binary vectors. Each of the user applications has utilized the information in the vector of a received message to format the data for presentation to the user. Selective call receivers utilized as wireless modems for external devices also have employed vector-based routing techniques.

As the industry moves toward new applications that are not directly linked to the prior-art vector-based schemes, a need arises for handling and delivering new data formats. Particularly for wireless modems, it will be inappropriate to add new vector types of each type of data that is desired. Proliferation of vectors could quickly consume the available vectors, making it difficult to extend the basic delivery approach. Furthermore, as new applications become available, the new vectors would have to be made available in the encoding portions of the infrastructure, requiring massive efforts to stay compatible.

Thus, what is needed is a method and apparatus in a wireless modem for routing data to an appropriate application for processing the data without requiring an explicit messaging vector. Preferably the method and apparatus will support applications that reside both inside and outside the wireless modem.

SUMMARY OF THE INVENTION

An aspect of the present invention is a method in a wireless modem for routing data to an application or to storage. The method comprises the steps of programming an application registry in the wireless modem, the application registry including routing information for routing the data, based upon data type, to the application or to storage; and thereafter, receiving the data and determining the data type. The method further comprises the step of routing the data in accordance with the routing information for the data type and, when the routing information indicates the application is located in an external device, further in accordance with an accessibility status of the external device.

Another aspect of the present invention is a wireless modem for routing data to an application. The wireless modem comprises a receiver for receiving the data, and a processing system coupled to the receiver for processing the data. The processing system comprises a memory for storing an application registry including routing information for routing the data, based upon data type, to the application or to storage in the memory. The wireless modem also includes an external device interface coupled to the processing system for interfacing with an external device. The processing system is arranged to program the application registry with the routing information, and thereafter, to receive the data and determine the data type. The processing system is also arranged to route the data in accordance with the routing information for the data type and, when the routing information indicates the application is located in the external device, further in accordance with an accessibility status of the external device.

DETAILED DESCRIPTION OF THE DRAWINGS

Figure 1:
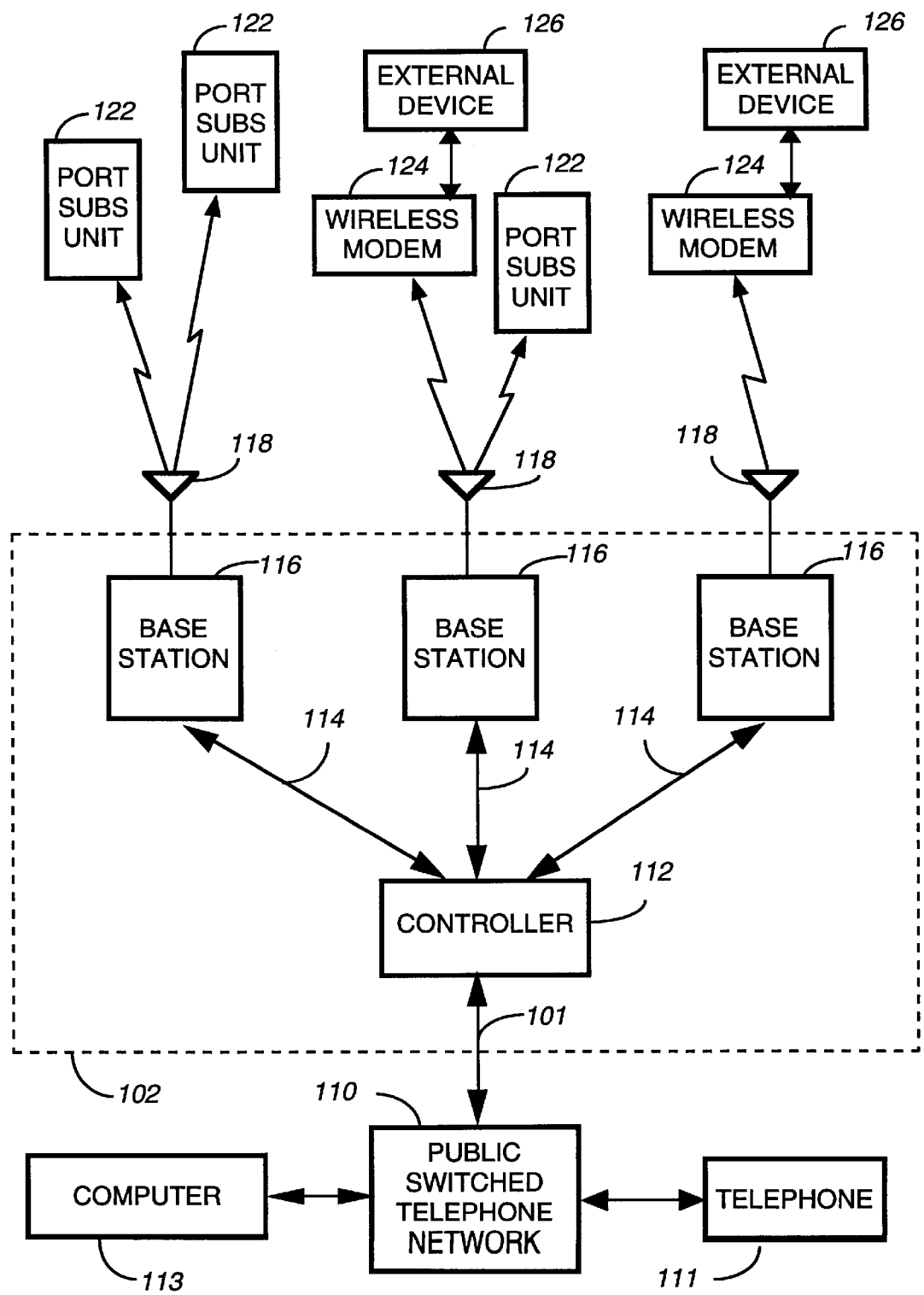
FIG. 1 is an electrical block diagram of an exemplary wireless messaging system in accordance with the present invention.

FIG. 1 is an electrical block diagram of an exemplary wireless messaging system in accordance with the present invention, comprising a fixed portion 102 including a controller 112 and a plurality of base stations 116, the messaging system also including a plurality of portable subscriber units 122. The base stations 116 preferably communicate with the subscriber units 122 utilizing conventional radio frequency (RF) techniques, and are coupled by communication links 114 to the controller 112, which controls the base stations 116. In addition to the portable subscriber units 122, the base stations 116 communicate with wireless modems 124 in accordance with the present invention. The wireless modems 124 are preferably coupled to at least one external device 126, such as a conventional personal computer (PC) or personal digital assistant (PDA).

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 116 is preferably the RF-Orchestra! transmitter and can include, in two-way messaging systems, the RF-Audience!™ receiver manufactured by Motorola, Inc. The subscriber units 122 are conventional selective call receivers. The wireless modems 124 preferably are similar to the CreataLink™ wireless modem manufactured by Motorola, Inc., and have software modified in accordance with the present invention. It will be appreciated that other similar hardware can be utilized as well for the controller 112, the base stations 116, the wireless modems 124, and the portable subscriber units 122.

Each of the base stations 116 transmits RF signals to the portable subscriber units 122 and wireless modems 124 via an antenna 118. The RF signals transmitted by the base stations 116 (outbound messages) preferably comprise selective call addresses identifying the portable subscriber units 122 and the wireless modems 124, and data messages originated by callers and computer systems, as well as commands originated by the controller 112 for adjusting operating parameters of the radio communication system.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 113 coupled to the PSTN 110. It will be appreciated that, alternatively, other types of communication networks, e.g., packet switched networks, the Internet, and local area networks, can be utilized as well for transporting originated messages to the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that, while the depicted embodiment for practicing the present invention is a one-way messaging system, the present invention is applicable also to a two-way messaging system.

Figures 2, 3:
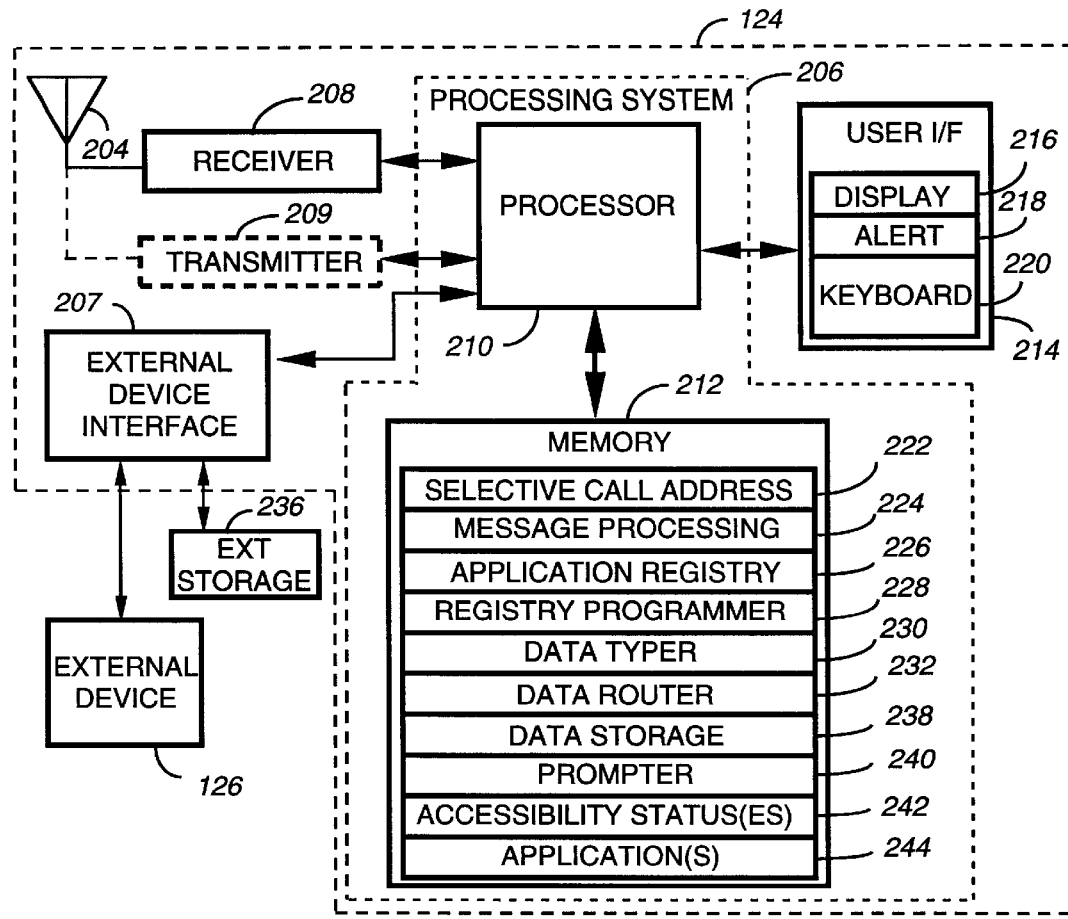
FIG. 2 is an electrical block diagram of an exemplary wireless modem in accordance with the present invention coupled to an external device and an external storage element.
FIG. 3 is an exemplary detailed view of an application registry in accordance with the present invention.

FIG. 2 is an electrical block diagram of an exemplary wireless modem 124 in accordance with the present invention, coupled to the at least one external device 126 and to an external storage element 236. The wireless modem 124 comprises an antenna 204 for intercepting an outbound message and (optionally) for transmitting an inbound message to a base receiver (not shown). The antenna 204 is coupled to a conventional receiver 208 for receiving the outbound message and, optionally, is coupled to a conventional transmitter 209 for transmitting the inbound message. The receiver 208 and the (optional) transmitter 209 are coupled to a processing system 206 for processing the outbound messages and for controlling the wireless modem 124 in accordance with the present invention. A user interface 214 preferably is also coupled to the processing system 206 for interfacing with a user. The user interface 214 preferably comprises a conventional display 216 for displaying the messages, a conventional alert element 218 for alerting the user when a message arrives, and a conventional keyboard 220 for controlling the wireless modem 124. A conventional external device interface 207 is also coupled to the processing system 206 for communicating with at least one external device 126 through well-known techniques. The external device interface 207 preferably is also coupled to the external storage element 236 for augmenting the storage capacity of the processing system 206. The external storage element 236 is preferably a conventional removable memory card, such as a Personal Computer Memory Card International Association (PCMCIA) memory card. It will be appreciated that, alternatively, other types of memory devices, e.g., magnetic disk memory, can be utilized as well fro the external storage element 236.

The processing system 206 comprises a conventional processor 210 and a conventional memory 212. The memory 212 stores software elements and other variables for programming the processing system 206 in accordance with the present invention. The memory 212 preferably includes a selective call address 222 to which the wireless modem 124 is responsive. In addition, the memory 212 includes a message processing element 224 for programming the processing system 206 to process messages through well-known techniques. The memory 212 further comprises an application registry 226 including routing information for routing received data, based upon data type, to an application or to storage, e.g., in the memory 212 or the external storage element 236, in accordance with the present invention. The memory 212 also includes a registry programmer 228 for programming the processing system to program the application registry 226. The programming of the application registry 226 preferably occurs as a part of the install process, using well-known techniques, for applications loaded into the wireless modem 124. Applications on the external device 126 that require the routing of data from the wireless modem 124 preferably would register themselves during a negotiation between the wireless modem 124 and the external device 126, using well known initialization techniques. It will be appreciated that, alternatively, the programming of the application registry 226 can take place during manufacture of the wireless modem 124, or as a download from the controller 112 through conventional over-the-air programming methods.

In addition, the memory 212 includes a data typer 230 for programming the processing system 206 to determine the data type, preferably from a data type identifier 404 (FIG. 4) transmitted with the data and supplied by the messaging system infrastructure, e.g., the controller 112. It will be appreciated that, alternatively, the data typer 230 can determine the data type by analyzing the first few bytes of the data, and looking therein for key code values and delimiters. The memory 212 also includes a data router 232 for programming the processing system 206 for routing the data in accordance with the routing information (in the application registry) for the data type and, when the routing information indicates the application is located in the external device 126, further in accordance with an accessibility status 242 of the external device 126. The memory 212 further comprises data storage 238 for storing the received data when the data cannot be immediately routed to an application. The memory also includes a prompter 240 for programming the processing system 206 to generate prompts and notifications to the user through the user interface when required. In addition, the memory 212 includes at least one accessibility status 242 corresponding to the external device 126 for indicating whether the external device 126 has been determined to be coupled to the external device interface 207 and is accessible to the wireless modem 124, e.g., powered up and operable. The processing system 206 preferably updates the accessibility status 242 of each external device periodically by, for example, "pinging" the external device 126 through well-known techniques to see whether the external device 126 responds appropriately. The memory 212 also preferably includes at least one application 244 for processing the received data.

FIG. 3 is a detailed view of an exemplary application registry 226 in accordance with the present invention. The application registry 226 includes a row 302 of information for each entry corresponding to a data type. The columns of the registry 226 list the data type, the application name, the application location, who to notify when data is present, and the routing for the entry. Note that some data types, e.g., the "irc" data type, have more than one entry. When a data type has more than one entry, the top entry is preferred, but a lower level entry may be used when the top entry cannot be used for the routing. For example, the "irc" data type is preferably forwarded to the application "mIRC" in the external device 126 when the external device is accessible. However, when the external device 126 is not accessible, the "irc" data type is forwarded to the "PageChat" application in the wireless modem 124. In addition, certain data types, e.g., the "text/*" data type, have "user controlled" processing. That is, the data is stored in the data storage 238, e.g., in a file called "/msg", and the user is notified that the data has arrived, but the data is not sent to the application until the user accesses the data through either the wireless modem 124 or the external device 126.

Figure 4:
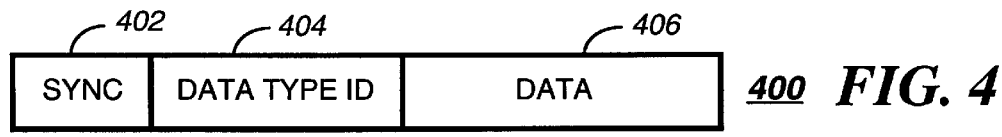
FIG. 4 is an exemplary protocol diagram in accordance with the present invention.
Figure 5:
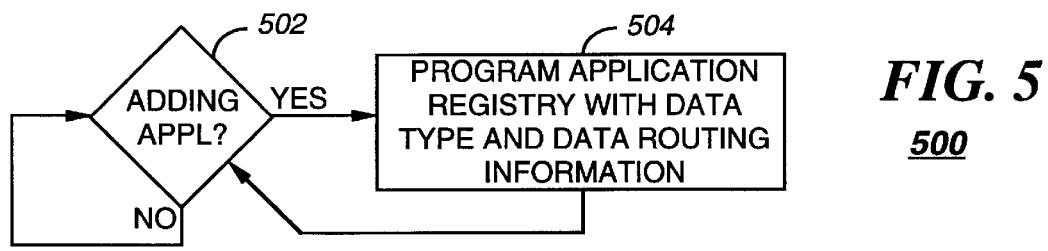
FIGS. 5–8 are flow diagrams depicting operation of the wireless modem in accordance with the present invention.

FIG. 4 is a simplified exemplary protocol diagram 400 for communication between the base stations 116 and the wireless modems 124 in accordance with the present invention. The diagram 400 includes a sync portion 402 for synchronizing the receiver 208 with transmissions of the base stations 116, through well-known techniques. The diagram 400 also includes the data type identifier 404 for identifying the data type. In addition, the diagram 400 includes the data to be processed.

FIGS. 5–8 are flow diagrams depicting operation of the wireless modem 124 in accordance with the present invention. Referring to the flow diagram 500 of FIG. 5, periodically the processing system checks 502 whether an application is being added to the wireless modem 124. If so, the registry programmer 228 cooperates with the application during installation to program 504 the application registry 226 with the data type and data routing information as depicted in the exemplary application registry 226 of FIG. 3.

Figure 6:
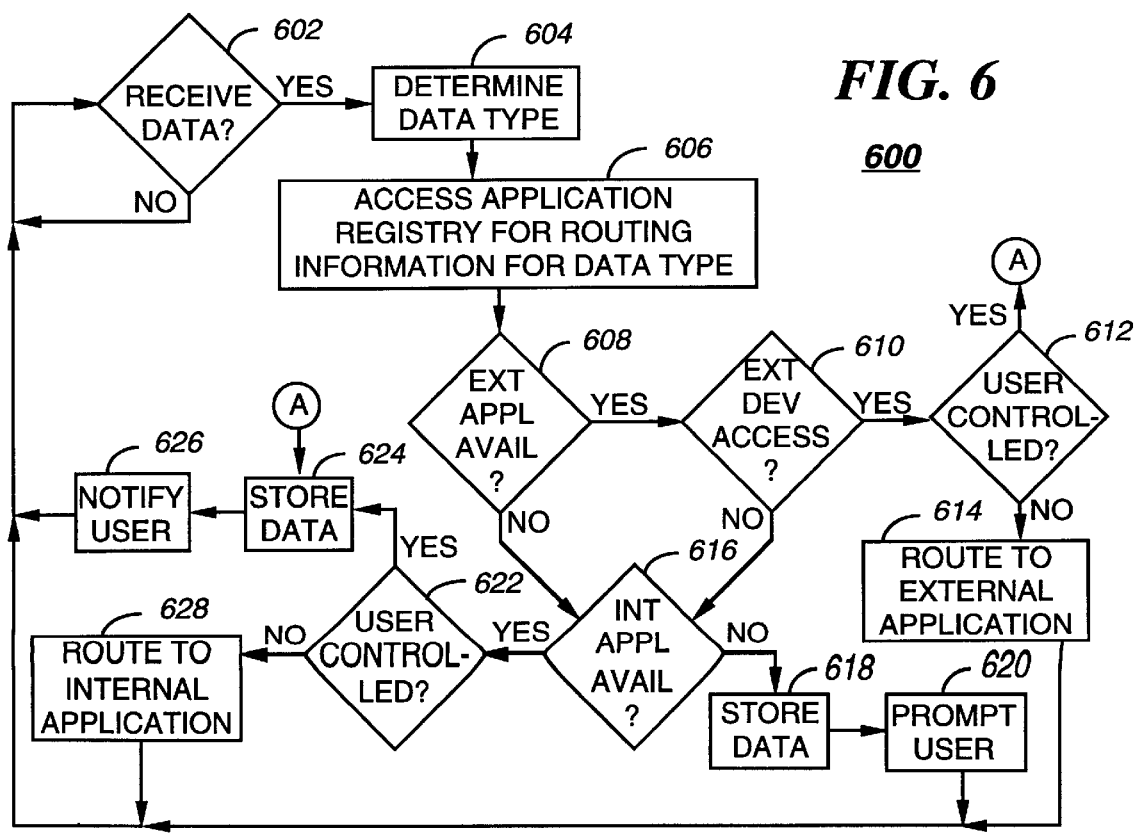

Referring to the flow diagram 600 of FIG. 6, operation of the wireless modem 124 in response to receiving data is depicted. Flow begins with the processing system 206 waiting 602 to receive the data. When the data is received, the processing system 206 accesses the data typer 230 to determine 604 the data type through well-known techniques. The processing system 206 then accesses 606 the application registry 226 to obtain the routing information for the data type. The processing system 206 then checks 608 whether the routing information indicates that an external application is available in the external device 126, e.g., a PC. If so, the processing system 206 checks 610 the accessibility status 242 corresponding to the external device 126 to determine whether the external device 126 is accessible, i.e., coupled and operable. If so, the processing system 206 checks 612 whether the processing of the data type is user controlled, i.e., normally sent to storage before processing in response to a user command. If so, the processing system 206 stores 624 the data, preferably in the data storage 238 of the processing system 206, or, alternatively, in the external storage element 236. The processing system 206 then notifies 626 the user, e.g., with an alert from the alert element 218, that the data is in storage, so that the user can then control the wireless modem 124 or the external device 126 to access the data through a compatible application. Flow then returns to step 602 to await new data.

If, on the other hand, at step 612 the processing system 206 determines that the processing of the data type is not user controlled, i.e., the data is to be routed automatically to the application, then the processing system 206 routes 614 the data to the external application, and the flow returns to step 602 to await new data. Also, if at step 610 the processing system 206 determines that the external device is not accessible, then flow moves to step 616, where the processing system 206 again accesses the application registry 226 to determine whether a compatible internal application is available for the data type. If so, the processing system 206 checks 622 whether the processing of the data type is user controlled. If so, the processing system 206 stores 624 the data, preferably in the data storage 238 of the processing system 206, or, alternatively, in the external storage element 236. The processing system 206 then notifies 626 the user, e.g., with an alert from the alert element 218, that the data is in storage, so that the user can then control the wireless modem 124 or the external device 126 to access the data through a compatible application. Flow then returns to step 602 to await new data.

If, on the other hand, at step 622 the processing system 206 determines that the processing of the data type is not user controlled, then the processing system 206 routes 628 the data to the internal application, and the flow returns to step 602 to await new data. Also, if at step 616 the processing system 206 determines that the internal application is not available, then the processing system 206 stores 618 the data, and prompts 620 the user of the wireless modem 124 to couple the wireless modem 124 to the external device 126, so that the data can be processed. It will be appreciated that some data has little or no meaning unless processed immediately, e.g., data type "http" for displaying an object on an existing view of a web page. For such data, instead of storing the data when no application is available, the processing system 206 can, alternatively, ignore the data and take no further action.

If, on the other hand, at step 608 the processing system 206 determines that no external application is available, then the flow moves to step 616, where the processing system 206 checks whether an internal application is available, as described herein above. Whenever the data has been stored in either step 624 or step 618, the routines described in FIGS. 7 or 8 can be used to further process the data.

Figure 7:
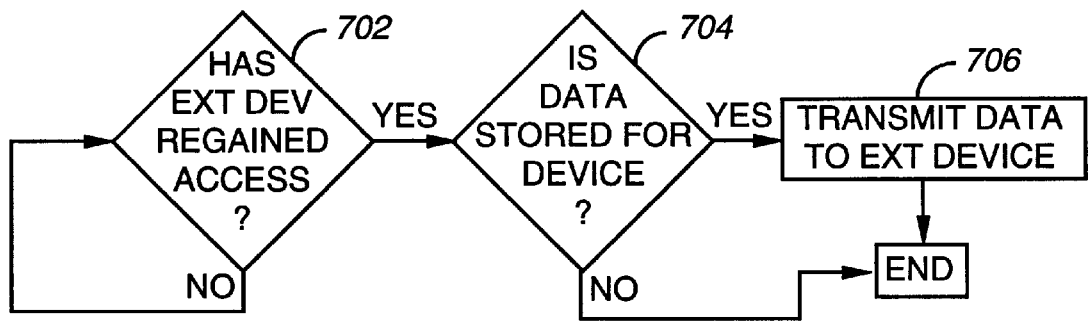

Referring to the flow diagram 700 of FIG. 7, the processing system 206 periodically checks 702 the accessibility status 242 of each external device 126 to determine whether a previously inaccessible external device 126 has become accessible to the wireless modem 124. If so, the processing system 206 also checks 704 the data storage 238 and (if available) the external storage element 236 to determine whether any data is stored for an application in the external device. If so, the processing system 206 transmits 706 the stored data to the appropriate application in the external device, as determined from the routing information of the application registry 226, and the process ends. If not, the process ends.

Figure 8:
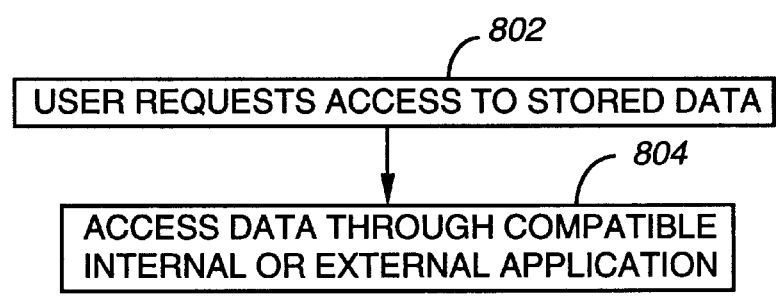

Referring to the flow diagram 800 of FIG. 8, operation of the wireless modem 124 in response to a user request is depicted. At step 802 the user requests access to stored data. For example, the user can request the display of a message received and stored earlier. In response, the processing system 206 accesses the requested data through a compatible internal or external application, as determined from the routing information of the application registry 226.

Thus, it should be clear from the preceding disclosure that the present invention provides a method and apparatus in a wireless modem for routing data to an appropriate application for processing the data without requiring an explicit messaging vector, thereby beneficially preventing a burdensome and expensive proliferation of vectors as new data types emerge. Also advantageously, the method and apparatus supports applications that reside both inside and outside the wireless modem. Many modifications and variations of the present invention are possible in light of the above teachings. Thus, it is to be understood that, within the scope of the appended claims, the invention can be practiced other than as described herein above.

What is claimed is:

1. A method in a wireless modem for routing data to an application or to storage, the method comprising the steps of:

programming an application registry in the wireless modem, the application registry including routing information for routing the data, based upon data type, to the application or to storage;

thereafter, receiving the data and determining the data type; and routing the data in accordance with the routing information for the data type and, when the routing information indicates the application is located in an external device, further in accordance with an accessibility status of the external device.

2. The method of claim 1, wherein the routing step comprises the step of routing the data to the application in the external device, when the routing information indicates the application is located in the external device, and the accessibility status indicates that the external device is accessible to the wireless modem.

3. The method of claim 1, wherein the routing step comprises the step of routing the data to an available compatible application in the wireless modem, when the routing information indicates the application is located in the external device, and the accessibility status indicates that the external device is not accessible to the wireless modem.

4. The method of claim 1, further comprising the step of storing the data in the wireless modem, when the routing information indicates the application is located in the external device and that no compatible application is available internal to the wireless modem, and the accessibility status indicates that the external device is not accessible to the wireless modem.

5. The method of claim 1, further comprising the step of storing the data in an external storage element coupled to the wireless modem, when the routing information indicates the application is located in the external device and that no compatible application is available internal to the wireless modem, and the accessibility status indicates that the external device is not accessible to the wireless modem.

6. The method of claim 1, further comprising the step of prompting a user of the wireless modem to couple the wireless modem to the external device, when the routing information indicates the application is located in the external device and that no compatible application is available internal to the wireless modem, and the accessibility status indicates that the external device is not accessible to the wireless modem.

7. The method of claim 1, further comprising the step of transmitting the data to the external device in response to the accessibility status indicating that a previously inaccessible external device for which the data has been stored has become accessible to the wireless modem.

8. The method of claim 1, further comprising the step of storing the data in one of the wireless modem and an external storage element, when the routing information indicates user control is required for accessing the data by the application.

9. The method of claim 1, further comprising the step of notifying a user of the wireless modem when the data has been routed to storage, so that the user can then control at least one of the wireless modem and the external device to access the data through a compatible application.

10. A wireless modem for routing data to an application, comprising:

a receiver for receiving the data;

a processing system coupled to the receiver for processing the data, the processing system comprising a memory for storing an application registry including routing information for routing the data, based upon data type, to the application or to storage in the memory; and an external device interface coupled to the processing system for interfacing with an external device, wherein the processing system is arranged to:

program the application registry with the routing information;

thereafter, receive the data and determine the data type; and route the data in accordance with the routing information for the data type and, when the routing information indicates the application is located in the external device, further in accordance with an accessibility status of the external device.

11. The wireless modem of claim 10, wherein the processing system is further arranged to route the data to the application in the external device, when the routing information indicates the application is located in the external device, and the accessibility status indicates that the external device is accessible to the wireless modem.

12. The wireless modem of claim 10, wherein the processing system is further arranged to route the data to an available compatible application in the wireless modem, when the routing information indicates the application is located in the external device, and the accessibility status indicates that the external device is not accessible to the wireless modem.

13. The wireless modem of claim 10, wherein the processing system is further arranged to store the data in the memory, when the routing information indicates the application is located in the external device and that no compatible application is available internal to the wireless modem, and the accessibility status indicates that the external device is not accessible to the wireless modem.

14. The wireless modem of claim 10, wherein the processing system is further coupled to an external storage element, and wherein the processing system is further arranged to store the data in the external storage element, when the routing information indicates the application is located in the external device and that no compatible application is available internal to the wireless modem, and the accessibility status indicates that the external device is not accessible to the wireless modem.

15. The wireless modem of claim 10, wherein the processing system is further arranged to prompt a user of the wireless modem to couple the wireless modem to the external device, when the routing information indicates the application is located in the external device and that no compatible application is available internal to the wireless modem, and the accessibility status indicates that the external device is not accessible to the wireless modem.

16. The wireless modem of claim 10, wherein the processing system is further arranged to transmit the data to the external device in response to the accessibility status indicating that a previously inaccessible external device for which the data has been stored has become accessible to the wireless modem.

17. The wireless modem of claim 10, wherein the processing system is further arranged to store the data in one of the memory and an external storage element, when the routing information indicates user control is required for accessing the data by the application.

18. The wireless modem of claim 10, further comprising a user interface coupled to the processing system for interfacing with a user of the wireless modem, and wherein the processing system is further arranged to notify the user through the user interface when the data has been routed to storage, so that the user can then control at least one of the wireless modem and the external device to access the data through a compatible application.

* * * * *